Patented Dec. 16, 1941

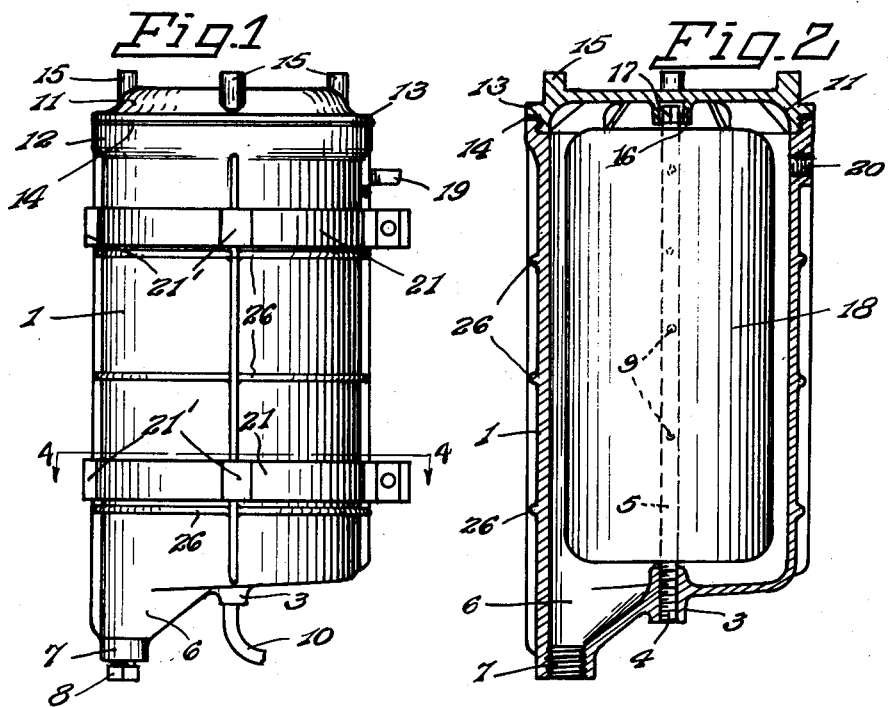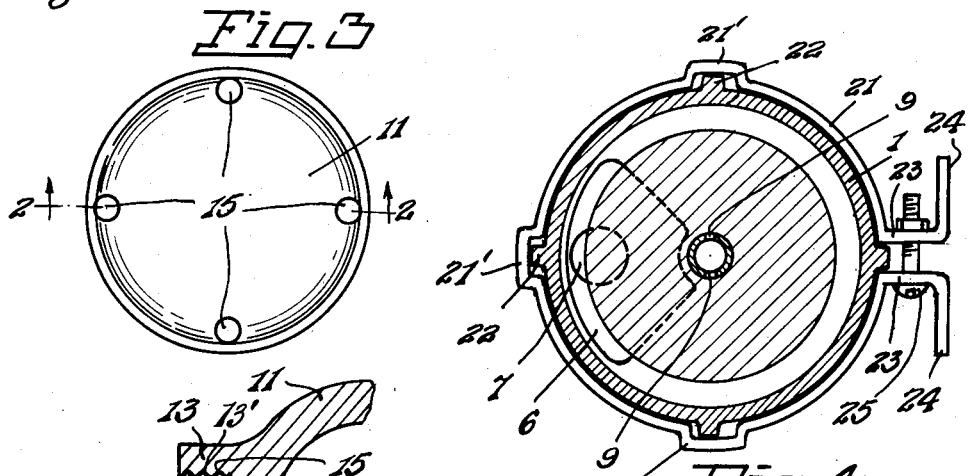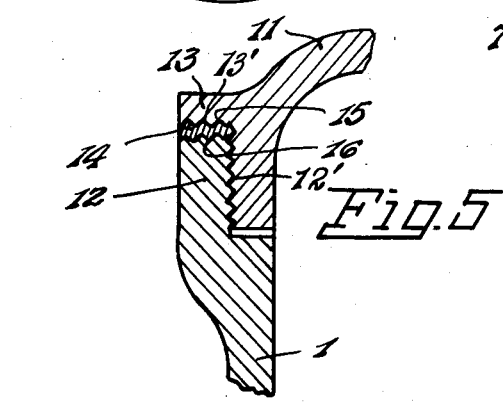

2,266,414

UNITED STATES PATENT OFFICE 2,266,414

OIL FILTER

Otto Dahl and Stanley Douglas Osborn,
Spokane, Wash.

Application March 15, 1939, Serial No. 262,055

1 Claim. (Cl. 210—131)

This invention relates to filters and more particularly to a filter for use as means for filtering the lubricating oil of an engine.

One object of the invention is to provide a filter of such construction that it may be mounted in the oil line of an engine and serve very effectively to remove dirt and other foreign matter from the oil and thus permit the oil to be used for an indefinite period of time without replenishing thereof becoming necessary.

Another object of the invention is to provide a filter having an improved casing of such construction that the filter may be mounted in either upright position or horizontal position, according to which position is most convenient when installing the filter.

A further object of the invention is to provide a filter casing capable of being firmly mounted by clamping bands surrounding the same and prevented from turning. It will thus be seen that a tube carrying filtering material and constituting the outlet of the filter may be inserted axially of the casing and screwed tightly through an internally threaded boss at an end of the casing. It will also be apparent that a threaded cover may be applied to the casing and screwed tightly into place.

Another object of the invention is to so form the cover that it may be applied and screwed tightly into place without the use of a wrench or other specially constructed tool.

And the invention has as a still further object to provide a cover of such formation that the adjacent end of the tube carrying the filter pack will be engaged in a pocket formed interiorly of the cover and the tube thus prevented from being bent out of alinement with the axis of the casing by vibration during operation of the engine. Therefore, the filter pack will be maintained in proper spaced relation to the walls of the casing and oil passing through the filter will be properly filtered.

The invention is illustrated in the accompanying drawing, wherein:

Fig. 1 is a side elevation of the improved filter.

Fig. 2 is a sectional view taken longitudinally through the filter.

Fig. 3 is a top plan view of the cover.

Fig. 4 is a sectional view taken transversely through the filter on the line 4—4 of Fig. 1.

Fig. 5 is an enlarged fragmentary sectional view taken through portions of the cover and casing.

This improved filter has a casing 1 formed of strong metal which is preferably rust-proof so that painting of the outer surface thereof is unnecessary. The casing is of cylindrical formation and is preferably mounted vertically in an upright position but may be mounted horizontally in a reclining position. At its lower end, the casing is formed with a bottom 2 having a central boss 3 through which a threaded opening 4 is formed to removably receive the threaded lower end portion of a tube 5. At one side of the boss, the bottom of the casing is depressed to form a sump or pit 6 having an internally threaded neck 7 which is normally closed by a threaded plug 8. Slush, muck and other dirt and foreign matter collects in the sump and when the plug is unscrewed and removed the accumulated matter will drain out of the casing. Therefore, the casing may be kept free from dirt. Clear oil which enters the tube 5 through the inlet perforations 9, flows downwardly through the tube to the outlet opening 4 and through the tube 10 which is screwed into this opening, to bearings and other portions of the engine which are to be lubricated.

The open upper end of the casing is normally closed by a cap or cover 11 which is also formed of strong metal and is screwed into engagement with the internally threaded annular flange 12 surrounding the upper end of the casing. An outstanding annular flange 13 surrounds the cover and overhangs the upper edge of the upstanding flange 12 when the cover is applied to the casing. A gasket 14 is employed to form a sealed joint between the cover and casing, and upon referring to Fig. 5, it will be seen that confronting surfaces 12' and 13' of the flanges 12 and 13 are roughened, as shown in Figure 5, to cause gripping engagement with the gasket and prevent dislodgement of the gasket. Lugs 15 project outwardly from the cover adjacent the periphery thereof for engagement by a metal rod or bar placed across the top when it is desired to tighten or remove the top. By providing these lugs, any bar-like implement may be used as means for turning the top and no special wrench is necessary.

A hollow boss or socket 16 projects inwardly from the center of the cover to receive the squared and solid outer end 17 of the tube 5, by means of which the tube is engaged by a wrench and turned to screw its threaded inner end portion into the opening 4 of the boss 3. By having the outer end of the tube engaged in the socket 16, the tube will be retained in axial relation to the casing and it cannot become bent when subjected to vibration during operation of the engine. Therefore, the filter pack 18 about the tube will be maintained in spaced relation to the walls of the casing and oil entering the casing through the pipe 19, which is screwed into the opening formed through the casing near its upper end, may readily fill the casing about the filter pack 18 and seep through said filter pack. Dirt and other foreign matter will accumulate upon the filter pack but the clear oil will enter the tube through the inlet perforations 9 and flow downwardly through the tube and out through the lower end thereof into the tube 10 leading from the outlet boss 3.

In order to mount the filter, there have been provided clamping bands 21 which fit about the casing, as shown in Fig. 4, and are formed with outwardly extending offset portions constituting pockets or seats 21' to receive ribs 22 formed on the casing longitudinally thereof. By having the casing formed with the ribs 22 which are engaged in the seats, the casing will be firmly held and prevented from turning during tightening or loosening of the cover and tube 5. Ends of the metal strips from which the clamps 20 are formed are bent to form shanks 23 from which extend attaching feet 24 which are preferably perforated so that by passing screws or bolts through them, they may be secured against a support. A bolt 25 passes through the shanks 23 and, when tightened, serves to draw the clamping bands into tight gripping engagement with the casing. The clamping bands fit about the casing adjacent certain of the circumferentially extending reinforcing ribs 26 formed about the casing. These ribs serve, not only as reinforcing ribs, but also as abutments for engaging the clamping bands and preventing the casing from slipping longitudinally out of the clamping bands.

When this filter is in use, it is mounted at a convenient point, preferably near the engine, and the tubes 10 and 19 screwed into the openings 4 and 20. It will thus be seen that the filter will be mounted in the oil line and when the engine is in operation, oil from the engine will flow into the casing and accumulate therein about the filter pack. This oil will seep through the filter pack and as all dirt and other foreign matter will be taken up or held back by the filter pack, only clean oil will reach the tube 5 and pass into the tube through the perforations 9. This clean oil flows downwardly through the tube and returns to the engine through the tube or pipe 10. The accumulated dirt forms muck or slush which accumulates in the sump 6 and may be drained out through the neck 7 when the plug 8 is removed.

Having thus described the invention, what is claimed is:

In a filter, a cylindrical casing open at its top and having a head at its lower end formed with a boss at its center, the boss being formed with a threaded bore, an outlet tube of perforated metal extending vertically in the casing and having an externally threaded lower end portion screwed into the threaded bore of the boss, the upper end portion of the tube being solid and squared to form flat side faces for engagement by a wrench, a filter pack surrounding the tube with the squared upper end portion of the tube projection upwardly from the filter pack, and a removable cover for the casing in threaded engagement therewith, said cover being formed with a depending internal boss at its center hollowed to form a socket receiving the squared upper end of said tube to brace the tube against lateral movement and retain the pack in spaced relation to side walls of the casing.

OTTO DAHL.
S. DOUGLAS OSBORN.